US011683423B2

(12) United States Patent
Ishihara

(10) Patent No.: US 11,683,423 B2
(45) Date of Patent: *Jun. 20, 2023

(54) IMAGE PROCESSING APPARATUS AND MULTI-FUNCTIONAL PERIPHERAL DEVICE WITH CUSTOMIZING OPERATION SCREENS

(71) Applicants: KABUSHIKI KAISHA TOSHIBA, Tokyo (JP); TOSHIBA TEC KABUSHIKI KAISHA, Tokyo (JP)

(72) Inventor: Atsushi Ishihara, Mishima Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 36 days.

This patent is subject to a terminal disclaimer.

(21) Appl. No.: 17/235,480

(22) Filed: Apr. 20, 2021

(65) Prior Publication Data

US 2021/0243315 A1 Aug. 5, 2021

Related U.S. Application Data

(63) Continuation of application No. 16/230,638, filed on Dec. 21, 2018, now Pat. No. 11,012,582, which is a (Continued)

(30) Foreign Application Priority Data

Nov. 30, 2015 (JP) .................................. 2015-233784

(51) Int. Cl.
*H04N 1/00* (2006.01)
*G06F 3/12* (2006.01)

(52) U.S. Cl.
CPC ....... *H04N 1/00411* (2013.01); *G06F 3/1204* (2013.01); *G06F 3/1205* (2013.01); (Continued)

(58) Field of Classification Search
CPC ....... H04N 1/00411; H04N 2201/0094; H04N 1/00392; H04N 1/00832; G06F 3/1205; (Continued)

(56) References Cited

U.S. PATENT DOCUMENTS 10,200,551 B2 * 2/2019 Ishihara ................ G06F 3/1285
11,012,582 B2 * 5/2021 Ishihara ................ G06F 3/1285
(Continued)

FOREIGN PATENT DOCUMENTS

JP 2008210383 A 9/2008
JP 2008224927 A 9/2008
(Continued)

OTHER PUBLICATIONS

Japanese Office Action dated Aug. 27, 2019, mailed in counterpart Japanese Application No. 2015-233784, 12 pages (with translation).
(Continued)

*Primary Examiner* — Ming Y Hon
(74) *Attorney, Agent, or Firm* — Kim & Stewart LLP

(57) ABSTRACT

According to an embodiment, an image processing apparatus includes a display unit, an operation unit, a processing unit, a storage unit, and a control unit. The display unit is configured to display an operation screen on which a processing mode and setting information may be selected. The operation unit is configured to receive an operation instruction from the operation screen displayed on the display unit and to transmit a processing job based on the operation instruction. The processing unit is configured to execute a process based on the processing job received from the operation unit. The storage unit is configured to store use
(Continued)

history information indicating the processing jobs. The control unit is configured to customize the operation screen according to the use history information stored by the storage unit and cause the display unit to display the customized operation screen.

20 Claims, 7 Drawing Sheets

Related U.S. Application Data continuation of application No. 15/248,449, filed on Aug. 26, 2016, now Pat. No. 10,200,551.

(52) U.S. Cl.
CPC .......... *G06F 3/1273* (2013.01); *G06F 3/1285* (2013.01); *G06F 3/1253* (2013.01); *G06F 3/1271* (2013.01); *H04N 2201/0094* (2013.01)

(58) Field of Classification Search
CPC .... G06F 3/1285; G06F 3/1204; G06F 3/1273; G06F 3/1253; G06F 3/1271
See application file for complete search history.

(56) References Cited

U.S. PATENT DOCUMENTS

| | | | | |
|---|---|---|---|---|
| 11,470,079 B1* | 10/2022 | Kurani | ................ | H04L 63/0876 |
| 2007/0198845 A1* | 8/2007 | Morikawa | ............. | G06F 3/1222 |
| | | | | 713/182 |
| 2008/0199199 A1 | 8/2008 | Kato et al. | | |
| 2008/0225032 A1* | 9/2008 | Nishimi | ............. | H04N 1/00514 |
| | | | | 345/211 |
| 2008/0297829 A1* | 12/2008 | Paek | .................. | G03G 15/5091 |
| | | | | 358/1.15 |
| 2010/0245909 A1* | 9/2010 | Yamaguchi | .......... | H04N 1/4433 |
| | | | | 358/1.15 |
| 2010/0290068 A1* | 11/2010 | Okada | ................ | H04N 1/00456 |
| | | | | 358/1.9 |
| 2010/0290071 A1* | 11/2010 | Okada | ................ | G03G 15/5091 |
| | | | | 358/1.13 |
| 2011/0051165 A1* | 3/2011 | Yamada | ............. | H04N 1/00413 |
| | | | | 358/1.15 |
| 2012/0017286 A1* | 1/2012 | Ogura | ................ | H04N 1/00222 |
| | | | | 726/28 |
| 2012/0140255 A1* | 6/2012 | Tanaka | .................... | G06F 9/445 |
| | | | | 358/1.13 |
| 2012/0262749 A1* | 10/2012 | Yamamoto | ........... | H04N 1/4413 |
| | | | | 358/1.14 |
| 2013/0016393 A1* | 1/2013 | Oku | .................... | H04N 1/32122 |
| | | | | 358/1.15 |
| 2013/0088735 A1* | 4/2013 | Cho | .................... | H04N 1/00432 |
| | | | | 358/1.15 |
| 2019/0116279 A1 | 4/2019 | Ishihara | | |

FOREIGN PATENT DOCUMENTS

| | | |
|---|---|---|
| JP | 2010268346 A | 11/2010 |
| JP | 2013035282 A | 2/2013 |

OTHER PUBLICATIONS

Extended European Search Report dated Aug. 31, 2017, mailed in counterpart European Application No. 16189136.1, 11 pages.

* cited by examiner

IMAGE PROCESSING APPARATUS AND MULTI-FUNCTIONAL PERIPHERAL DEVICE WITH CUSTOMIZING OPERATION SCREENS

CROSS-REFERENCE TO RELATED APPLICATIONS

This application is a continuation of U.S. patent application Ser. No. 16/230,638, filed on Dec. 21, 2018, which is a continuation of U.S. patent application Ser. No. 15/248,449, filed on Aug. 26, 2016, now U.S. Pat. No. 10,200,551, granted on Feb. 5, 2019 which is based upon and claims the benefit of priority from Japanese Patent Application No. 2015-233784, filed Nov. 30, 2015, the entire contents of each of which are incorporated herein by reference.

FIELD

Embodiments described herein relate generally to an information processing apparatus and an information management apparatus.

BACKGROUND

Digital multi-functional peripherals serving as image processing apparatuses include display units (operation panels) with touch panels serving as user interfaces receiving operation instructions from users. The digital multi-functional peripherals of the related art have functions of displaying fixed operation menu screens or operation menu screens customized manually by individual users on operation panels. However, the digital multi-functional peripherals of the related art may not provide user interfaces in accordance with use histories of a plurality of users and use histories of a plurality of digital multi-functional peripherals.

DETAILED DESCRIPTION

According to an embodiment, there is provided an image processing apparatus including a user interface with good operability and an information management apparatus capable of supplying data of an operation screen with good operability to the image processing apparatus.

According to an embodiment, an image processing apparatus includes a display unit, an operation unit, a processing unit, a storage unit, and a control unit. The display unit is configured to display an operation screen on which a processing mode and setting information may be selected. The operation unit is configured to receive an operation instruction from the operation screen displayed on the display unit and to transmit a processing job based on the operation instruction. The processing unit is configured to execute a process based on the processing job received from the operation unit. The storage unit is configured to store use history information indicating prior processing jobs. The control unit is configured to customize the operation screen according to the use history information stored by the storage unit and cause the display unit to display the customized operation screen.

Hereinafter, an embodiment will be described in detail with reference to the drawings.

An image processing apparatus according to the embodiment is, for example, a digital multi-functional peripheral (MFP). An image processing system according to the embodiment is a system that includes a plurality of image processing apparatuses and a server serving as an information management apparatus.

Hereinafter, the configurations of an MFP serving as an image processing apparatus and a server serving as an information management apparatus will be described.

Figure 1:
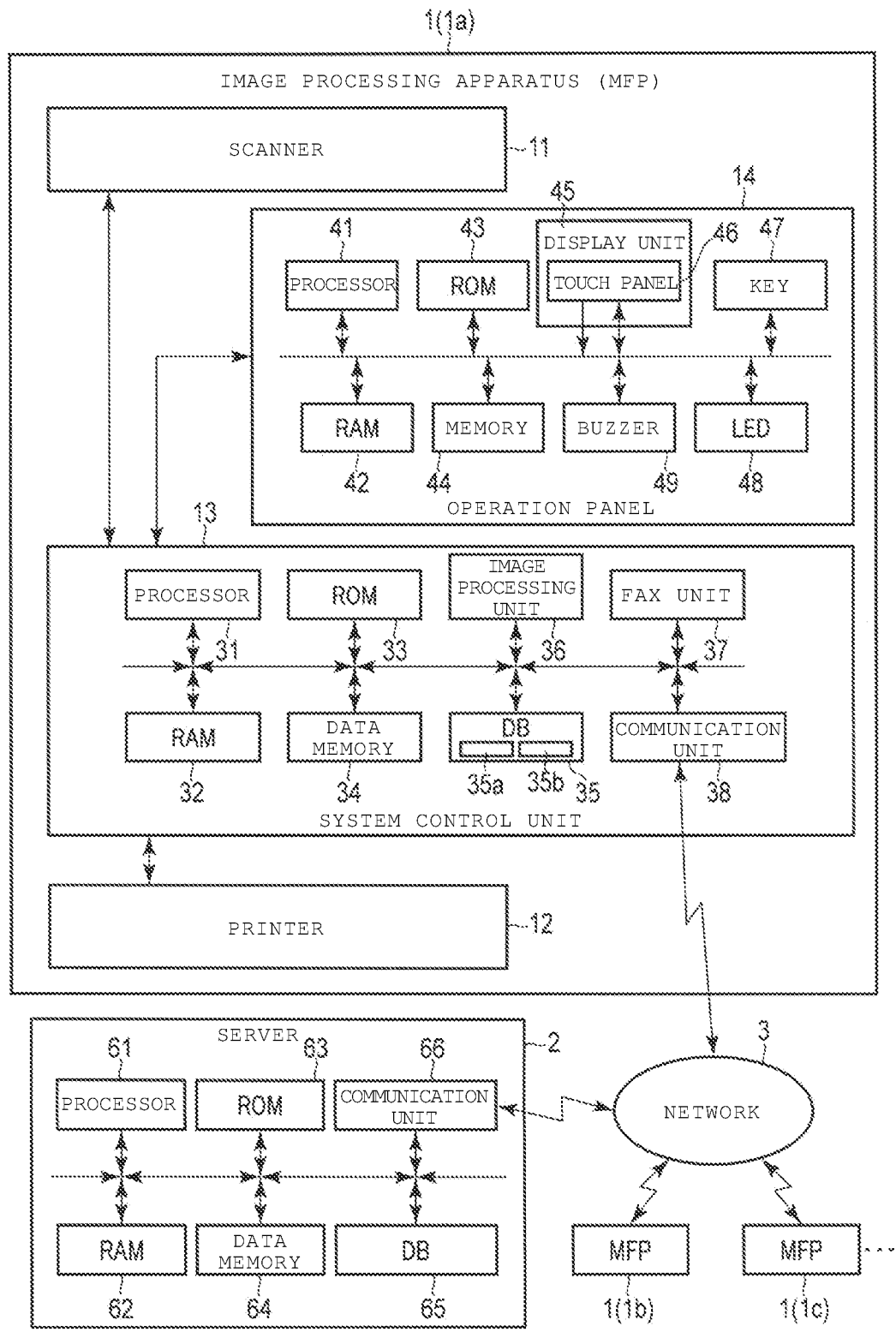
FIG. 1 is a block diagram illustrating examples of the configuration of an MFP serving as an image processing apparatus and a server serving as an information management apparatus according to an embodiment.

FIG. 1 is a block diagram illustrating examples of the configurations of an MFP 1 and a server 2.

The plurality of MFPs 1 (1a, 1b, 1c, . . . ) and the server 2 are included in an image processing system. In the image processing system, the plurality of MFPs 1 (1a, 1b, 1c, . . . ) and the server 2 are connected to each other via a network 3. Each of the MFPs 1b, 1c, etc. is assumed to have the same configuration as the MFP 1a. Here, the MFPs 1a, 1b, 1c, . . . may not be the same type of apparatus and may achieve functions to be described below.

In the example of the configuration illustrated in FIG. 1, the MFP 1 includes a scanner 11, a printer 12, a system control unit 13, and an operation panel 14. The scanner 11, the printer 12, and the operation panel 14 are connected to the system control unit 13.

The scanner 11 is an image input unit serving as a processing unit. The scanner 11 optically reads an image on a document and converts the image into image data. The scanner 11 reads an image on a document placed on a document table, which may be glass, or an image on the surface of a document supplied by an automatic document feeding device (ADF). The scanner 11 reads an image of the document according to operation settings and an operation instruction from the system control unit 13. The scanner 11 outputs the image data of the read document to the system control unit 13.

The printer 12 is an image forming unit serving as a processing unit. The printer 12 forms an image on a sheet that serves as an image recording medium. The printer 12 prints an image on a sheet under a printing condition based on operation (printing) settings designated from the system control unit 13. In the printer 12, printing setting can be defined according to a specification. For example, the printer 12 is able to perform color printing, duplex printing, stapling, hole punching, and the like. In the printer 12, the size and kind of a sheet on which an image is printed can also be specified.

As the printer 12, any of various image forming type printers can be applied. For example, the printer 12 may be an electrographic printer, an ink jet type printer, or a thermal transfer type printer.

The system control unit 13 generally controls the entire MFP 1. The system control unit 13 is connected to units of the MFP 1, such as the scanner 11, the printer 12, and the operation panel 14. The system control unit 13 executes bi-directional communication with the scanner 11, the printer 12, and the operation panel 14. The system control unit 13 generally controls operations of units such as the scanner 11, the printer 12, and the operation panel 14. The system control unit 13 also has a function of executing various processes such as image processing.

The system control unit 13 includes a processor 31, a RAM 32, a ROM 33, a data memory 34, a database (DB) 35, an image processing unit 36, a FAX unit 37, and a communication unit 38.

The processor 31 functions as a control unit. The processor 31 includes a circuit that executes a calculation process according to a program. The processor 31 is, for example, a CPU. The processor 31 achieves various processing functions by executing programs stored by the ROM 33 or the data memory 34. The RAM 32 is a working memory. The RAM 32 is, for example, a volatile memory. The RAM 32 reads a program to be executed or functions as a buffer memory. The ROM 33 is a program memory. The ROM 33 is, for example, a rewriting-disabled nonvolatile memory. The ROM 33 stores a program unique to the MFP 1, setting data, and the like.

The data memory 34 stores a program, control data, setting information, and the like. The data memory 34 is, for example, a rewriting-enabled nonvolatile memory. The data memory 34 may store registration information for user authentication.

The DB 35 stores use history information about prior processing jobs. The DB 35 may be a memory from which information can be read by the processor 31. The DB 35 may be provided in the data memory 34 or may be provided in a storage device on the outside of the system control unit 13. The DB 35 may be provided in a storage device inside an external apparatus (for example, the server 2) capable of communicating with the MFP 1 via the communication unit 38. The use history information stored by the DB 35 includes information such as execution times, executing users, processing modes, and settings as information about prior processing jobs.

Each MFP 1 includes a DB 35. Each DB 35 includes a first storage region 35a that stores use history information of the corresponding MFP 1 and a second storage region 35b that stores use history information of the entire system. For example, the first storage region 35a stores aggregated use history information about processing jobs executed on the corresponding MFP 1 by the processor 31. The second storage region 35b stores the use history information of the entire system acquired from the server 2.

The image processing unit 36 processes image data. The image processing unit 36 executes image processing on image data read from a document by the scanner 11. The image processing unit 36 may execute image processing on image data acquired from an external apparatus via the communication unit 38 or the FAX unit 37. The processor 31 may execute some or all of the image processing functions of the image processing unit 36.

The FAX unit 37 is a FAX interface that executes facsimile communication. For example, the FAX unit 37 executes FAX transmission of image data according to operation settings (FAX setting) transmitted from the processor 31. The FAX unit 37 functions as one of the processing units.

The communication unit 38 is a network interface that executes data communication with an external apparatus via the network 3. The processor 31 causes the communication unit 38 to communicate with the server 2 via the network 3. The processor 31 may cause the communication unit 38 to communicate with other MFPs via the network 3.

The operation panel 14 is a user interface. The operation panel 14 displays guidance for a user and receives an operation instruction by the user. In the example of the configuration illustrated in FIG. 1, the operation panel 14 includes a processor 41, a RAM 42, a ROM 43, a memory 44, a display unit 45, a touch panel 46, a key 47, an LED 48, and a buzzer 49.

The processor 41 controls the operation panel 14. The processor 41 includes a calculation circuit that executes a program. The processor 41 is, for example, a CPU. The processor 41 achieves various processing functions by executing programs stored in the ROM 43. The processor 41 controls each unit of the operation panel 14 according to a control signal from the system control unit 13. The processor 41 supplies information input to each unit of the operation panel 14 to the system control unit 13.

The RAM 42 is a working memory. The RAM 42 is, for example, a volatile memory. The ROM 43 is a nonvolatile program memory. The memory 44 is a nonvolatile memory in which rewriting is enabled. The memory 44 stores a program, control data, setting information, display data, and the like. The data stored by the memory 44 can be appropriately updated.

The display unit 45 displays an operation menu screen and operation guidance. The display unit 45 is, for example, a liquid crystal display device. The display unit 45 includes a touch panel 46 on a display screen. The touch panel 46 functions as an operation unit. The touch panel 46 detects a spot at which the user touches on the display screen of the display unit 45. The touch panel 46 supplies information indicating a position touched by the user as a detection signal to the processor 41. The operation unit may be an operation unit capable of selecting a specific spot (an icon or the like) displayed by the display unit 45 or may be, for example, an operation device such as a pointing device.

The processor 41 controls a screen displayed on the display unit 45. The processor 41 displays various operation screens on the display unit 45 according to instructions from the system control unit 13. For example, the processor 41 displays an operation screen customized according to an instruction from the system control unit 13 on the display unit 45.

The processor 41 detects a position input (touched) by the user on the display screen of the display unit 45 based on a detection signal by the touch panel 46. For example, the processor 41 specifies an icon (instruction content) input by the user based on the display position of the icon displayed on the display unit 45 and the touch position of the user detected by the touch panel 46. The processor 41 supplies information indicating the detected instruction content to the processor 31 of the system control unit 13. The processor 41 may detect content of an operation instruction according to a touch operation (a touch state such as a movement distance or a movement speed of the touch position) executed on the display screen by the user and detected by the touch panel 46.

The key 47 is one hard key or a plurality of hard keys. For example, the key 47 may be a numeric key or a button for instructing a function of scanning, printing, FAX, electronic filing, or the like. The LED 48 is one LED lamp or a plurality of LED lamps. The LED 48 indicates an operation state of the MFP 1. For example, the LED 48 lights when operation abnormality occurs. The buzzer 49 produces a sound. For example, the buzzer 49 produces a warning sound indicating abnormality when an error occurs.

An interface which conforms to a general standard for connecting an external apparatus may be provided in the operation panel 14. The interface provided in the operation panel 14 may be configured such that a portable storage device, a numeric key, a portable keyboard, or the like can be connected.

In the example of the configuration illustrated in FIG. 1, the server 2 includes a processor 61, a RAM 62, a ROM 63, a data memory 64, a database (DB) 65, and a communication unit 66.

The processor 61 functions as a control unit. The processor 61 includes a circuit that executes a calculation process according to a program. The processor 61 is, for example, a CPU. The processor 61 achieves various processing functions by executing programs stored by the ROM 63 or the data memory 64. The RAM 62 is a working memory. The RAM 62 is, for example, a volatile memory. The RAM 62 reads a program to be executed or functions as a buffer memory. The ROM 63 is a program memory. The ROM 63 is, for example, a rewriting-disabled nonvolatile memory. The data memory 64 stores control data, a control program, setting information, and the like. The data memory 64 is, for example, a rewriting-enabled nonvolatile memory.

The DB 65 stores history information indicating a use history of each MFP in the system. The history information stored by the DB 65 includes information such as the identity of the MFP that executed each process execution times, user information, processing content, and settings. The DB 65 may be provided in a storage device other than the data memory 64 or may be provided in an external apparatus (for example, another data server) capable of communicating with the server 2.

The communication unit 66 is a network interface that executes data communication with an external apparatus via the network 3. The processor 61 causes the communication unit 66 to communicate with each MFP 1 via the network 3. The processor 61 may be connected to an external network via the communication unit 66.

Next, an overview of an operation of the image processing system according to the embodiment will be described.

In the image processing system, each MFP 1 stores use history information about prior processing jobs in each DB 35. Each MFP 1 stores information indicating processing mode, settings, user information, execution time, and the like as the use history information of the MFP 1 corresponding to the DB 35 in the first storage region 35a of the DB 35 for each executed process. The communication unit 66 of each MFP 1 transmits (uploads) its use history information stored in the first storage region 35a of the DB 35 to the server 2.

The server 2 collects (acquires) the use history information of each MFP. The server 2 stores the use history information collected from each MFP in the DB 65. The server 2 aggregates the collected use history information according to predetermined classifications. The server 2 accumulates the aggregated result as use history information of the entire system along with the individual use history records in the DB 65. The server 2 may accumulate the aggregate result obtained by aggregating the use history information according to a plurality of classifications in the DB 65. The server 2 delivers the use history information of the entire system accumulated in the DB 65 to each MFP 1.

Each MFP 1 stores the use history information of the entire system delivered (downloaded) from the server 2 in the second storage region 35b of the DB 35. Each MFP 1 generates a customized screen based on its own use history information accumulated in the DB 35 and the use history information of the entire system. Each MFP 1 displays the generated customized screen on the display unit 45.

Next, a display example of the customized screen displayed by the display unit 45 of the operation panel 14 of the MFP 1 according to the embodiment will be described.

The MFP 1 selects the use history information from the DB 35 based on a specific condition (for example, an order of high execution frequency). The MFP 1 generates an icon (short-cut) for instructing a process of the same processing content as the use history information selected under the specific condition. The MFP 1 displays the customized screen including one menu screen or a plurality of menu screens on which the generated icon is arranged, on the display unit 45.

Figure 2A:
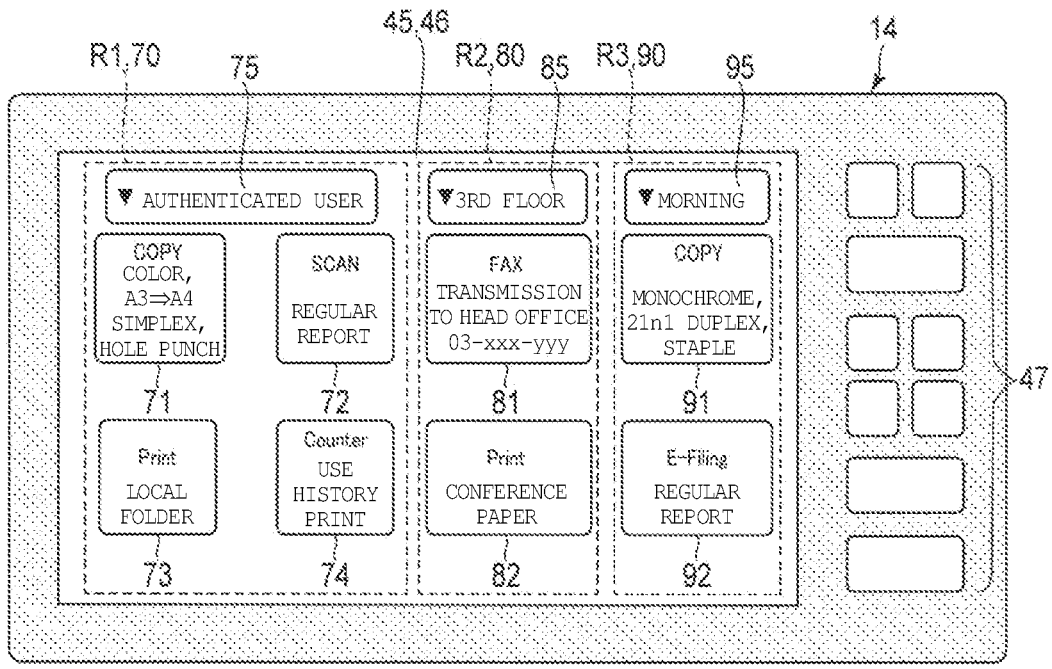
FIG. 2A is a diagram illustrating a first display example in the MFP serving as the image processing apparatus according to the embodiment.

FIG. 2A illustrates a first display example of the customized screen displayed by the display unit 45 of the MFP 1.

The customized screen illustrated in FIG. 2A includes three display regions R1, R2, and R3. In the display regions R1, R2, and R3, menu screens 70, 80, and 90 are respectively displayed. On the menu screens 70, 80, and 90, icons generated based on the use history information selected under different conditions are displayed.

In the example illustrated in FIG. 2A, the menu screen 70 generated based on the use history information of the MFP 1 displaying the screen 70 is displayed in the first display region R1. The menu screen 70 includes four icons 71, 72, 73, and 74 and a selection field 75. The icons 71, 72, 73, and 74 are icons for selecting the same processes as the processing content indicated by the use history information. The icons 71, 72, 73, and 74 indicate that a copy mode, a scan mode, a print mode, and a counter mode are used with high frequency.

The icon 71 is a button for executing the highest use frequency process among the use history information, in this case in the copy mode. The icon 71 in FIG. 2A indicates that the authenticated user executes color copying from page size A3 to A4, in simplex mode, and using hole punch many times (high execution frequency). When the icon 71 is selected, the system control unit 13 executes a color copying process with those settings.

The icon 72 is a button for selecting a process with one of the highest use frequencies among the use history information, in this case in the scan mode. The icon 72 in FIG. 2A indicates that the authenticated user scans a regular report in the scan mode many times (high execution frequency). When the icon 72 is selected, the system control unit 13 scans the regular report in a scanning process.

The icon 73 is a button for selecting a process with one of the highest use frequencies among the use history information, in this case in the print mode. The icon 73 in FIG. 2A indicates that the authenticated user prints data from a local folder many times (high execution frequency). When the icon 73 is selected, the system control unit 13 prints a file from the local folder.

The icon 74 is a button for selecting a process with one of the highest use frequencies among the use history information, in this case in a mode other than the copy mode, the scan mode, and the print mode. The icon 74 in FIG. 2A indicates that the authenticated user prints use history in the counter mode (management mode) many times (high execution frequency). When the icon 74 is selected, the system control unit 13 prints the use history in the counter mode.

In the selection field 75, a display setting for the menu screen 70 is displayed and/or selected. In the selection field 75, a condition set in advance or a condition designated by the user is displayed. In the selection field 75, a condition in which the user makes a selection from a plurality of options displayed in a pull-down menu or the like is displayed. As a condition for generating the menu screen 70, an "authenticated user", "a previous one day" of the apparatus, a "previous one week" of the apparatus, a "previous one month" of the apparatus, or the like can be selected. The conditions for generating the menu screen 70 available in the selection field 75 are attributes of the use history used to customize the menu screen 70 displayed in the first region R1.

When the "authentication user" attribute is displayed in the selection field 75, the menu screen 70 is generated based on the use history information of the user authenticated in the use history information of the MFP 1 generating the display. When the "previous one day (one week or one month)" attribute is displayed in the selection field 75, the menu screen 70 is generated based on the use history information corresponding to the previous one day (one week or one month) of the MFP. When the "authentication user" attribute is displayed in the selection field 75, the menu screen 70 may also be generated based on the use history information of the user authenticated in the use history information of the entire system.

In the second display region R2, a menu screen 80 generated based on the use history information of the entire system is displayed in the example illustrated in FIG. 2A. The menu screen 80 includes two icons 81 and 82 and a selection field 85. In the selection field 85, a condition in which the menu screen 80 is generated is displayed. The icons 81 and 82 indicate high execution frequency jobs based on the condition displayed in the selection field 85. The conditions available in the selection field 85 are attributes of the system use history information used to generate the menu screen 80 in the second region R2.

In the example illustrated in FIG. 2A, the icon 81 is a button for instructing "FAX transmission to head office". The icon 82 is a button for instructing "print of conference paper". The selection field 85 indicates that the menu screen 80 is generated based on the use history information of MFP's located on the "3rd" floor, as an attribute. The menu screen 80 illustrated in FIG. 2A indicates that the execution frequencies of "FAX transmission to head office" and "print of conference paper" are high in the MFP's located on "3rd floor". The attributes displayed in the selection field 85 can be selected by the user. For example, in the selection field 85, a plurality of options (for example, "3rd floor", "2nd floor", "accounting department", "legal department", "Tokyo", "Kanagawa", "MFP 1", and "MFP 2") which can be selected by the user are displayed in a pull-down menu or the like.

In the third display region R3, the menu screen 90 generated based on the use history information of the entire system is displayed in the example illustrated in FIG. 2A.

The menu screen 90 illustrated in FIG. 2A includes two icons 91 and 92 and a selection field 95. In the selection field 95, a condition in which the menu screen 90 is generated is displayed. The condition is an attribute of the system use history used to generate the menu screen 90 in the third region R3. The icons 91 and 92 indicate high execution frequency jobs based on the condition displayed in the selection field 95.

In the example illustrated in FIG. 2A, the icon 91 is a button for selecting monochrome copying, 2 in 1, duplex, and staple. The icon 92 is a button for selecting display of data filed in a regular report folder. The selection field 95 in FIG. 2A indicates that the menu screen 90 is generated based on the use history information of the entire system in a time period of "morning", as an attribute. Thus, in the selection field 95, a time period for which the use history information is narrowed down can be selected. The time period displayed in the selection field 95 can be selected by the user. For example, in the selection field 95, a plurality of options (for example, "morning", "afternoon (daytime)", and "night") which can be selected by the user are displayed in a pull-down menu or the like. In the menu screen 90, processing jobs with high historical execution frequency in the time period displayed in the selection field 95 are displayed with icons.

Figure 2B:
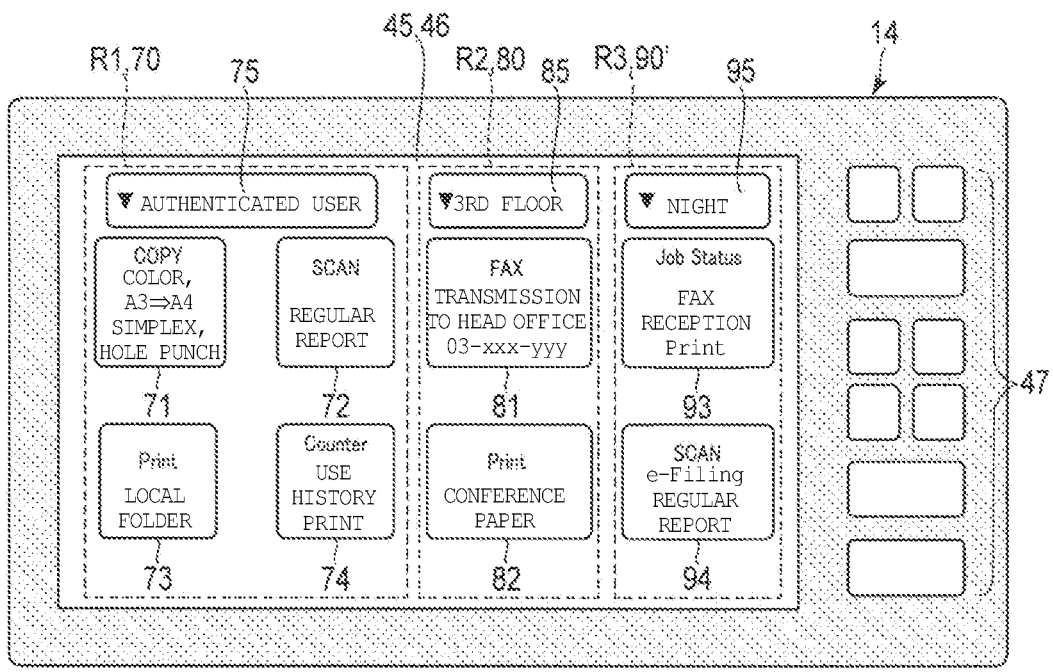
FIG. 2B is a diagram illustrating a second display example in the MFP serving as the image processing apparatus according to the embodiment.

FIG. 2B illustrates a second display example of the customized screen. FIG. 2B is different from the display example illustrated in FIG. 2A in the display content of a menu screen 90'. That is, when the condition displayed in the selection field 95 illustrated in FIG. 2A is changed to "night", the customized screen is updated from the menu screen 90 to the menu screen 90' illustrated in FIG. 2B. The menu screen 90' illustrated in FIG. 2B includes two icons 93 and 94 and the selection field 95.

The icon 93 is a button for selecting display of the status of one or more unprocessed jobs. The icon 94 is a button for selecting that scanned data is filed to a regular report folder. The selection field 95 in FIG. 2B indicates that the menu screen 90' is based on the use history information of the entire system in the time period of "night". That is, FIGS. 2A and 2B illustrate the fact that the execution frequency of the processing jobs illustrated in the icons 91 and 92 is high in "morning" and the execution frequency of the processing jobs illustrated in the icons 93 and 94 is high in "night".

Thus, the attributes used to generate the menu screens 70, 80, and 90 in the first, second, and third regions R1, R2, and R3, respectively, are user selectable attributes that narrow the use history information used to generate the respective screens. The attributes are generally attributes of time, location, group, or the user, as described above. When the user selects an attribute in any of the selection fields 75, 85, or 95, the control unit causes the display to customize the respective menu screen according to the related use history information that matches the selected attribute. The icons in the menu screen are customized to reflect high frequency processing modes and settings according to the matching use history.

The menu screens in the customized screen are not limited to the configurations illustrated in FIGS. 2A and 2B, but may be set arbitrarily. For example, the number of icons displayed on each menu screen, the position of the icons, and the position of the selection field can be set arbitrarily. The menu screen displayed inside the customized screen can be set for each user or a group of users. For example, the display setting of the customized screen may be saved as user setting information.

Next, an operation of the MFP 1 will be described.

Figure 3:
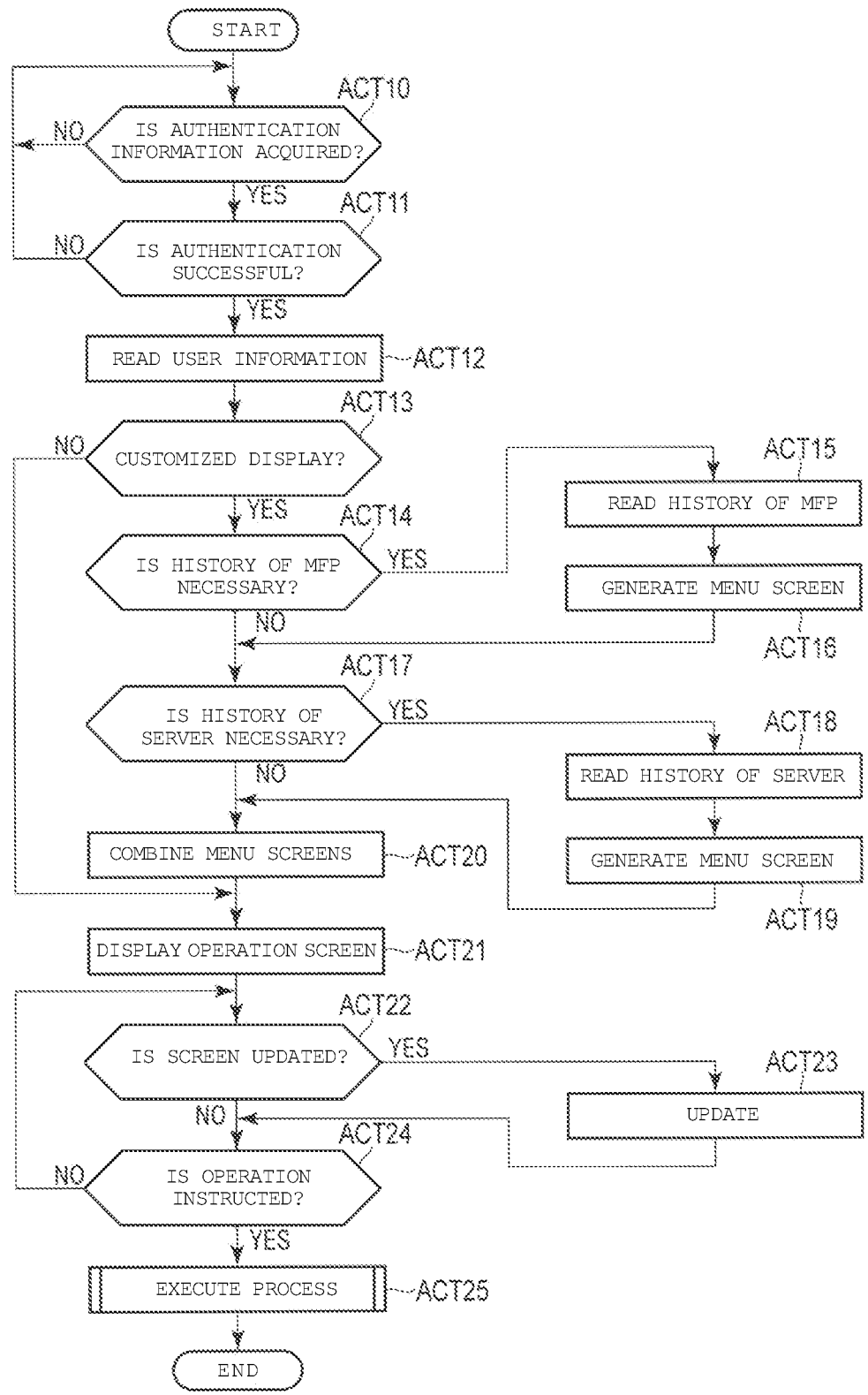
FIG. 3 is a flowchart illustrating a process of displaying a customized screen in the MFP serving as the image processing apparatus according to the embodiment.

FIG. 3 is a flowchart illustrating an example of an operation included in a process of displaying the customized screen in the MFP 1 according to the embodiment.

In a standby state, the MFP 1 performs an authentication process based on information presented by the user (ACT 10). For example, the MFP 1 acquires information (for example, a user ID or a password number) input by the user using the operation panel 14. The MFP 1 may acquire information read by a card reader from a card (for example, an IC card) presented by the user when the card reader is connected to the system control unit 13. The MFP 1 may acquire biological information of the user when an apparatus (for example, a camera or a fingerprint scanner) acquiring the biological information of the user is connected to the system control unit 13.

The description herein explains processes performed by the MFP 1 based on successful authentication by a user. However, the MFP 1 may be run and used with the user unauthenticated. When the MFP 1 is run with the user unauthenticated (ACT 11 and ACT 12 are omitted), the processor 31 may use default settings.

When the information presented by the user is acquired (YES in ACT 10), the processor 31 of the system control unit 13 of the MFP 1 executes an authentication process based on the information presented by the user (ACT 11). Registered information for user authentication may be stored in the data memory 34 or may be stored in the data memory 64 of the server 2 which can be communicated via the network 3. The authentication process may be executed by an external apparatus such as an authentication server which can be communicated via the network 3. When the authentication server executes the authentication process, the processor 31 may transmit information acquired from the user to the authentication server and receive an authentication result from the authentication server.

When the authentication of the user is successful (YES in ACT 11), the processor 31 of the system control unit 13 reads user information of the user of which the authentication is successful (ACT 12). Here, the user information is assumed to include setting information or the like for each user. The user information may be read by the processor 31. For example, the user information may be stored in the data memory 34 or may be stored in an external device such as a data memory of the server 2 which can be communicated via the network 3.

When the user information of the authenticated user is acquired, the processor 31 searches for display settings of the customized screen included in the acquired user information (ACT 12). When no such display settings are found (NO in ACT 13), the processor 31 displays a standard menu screen on the display unit 45 of the operation panel 14.

When the processor 31 determines that the customized screen is displayed (YES in ACT 13; the authenticated user information includes display settings for the customized screen), the processor 31 determines whether to display the menu screen based on the history information of the MFP on which the user is authenticated (ACT 14). When the processor 31 determines that the history information of the individual MFP is to be displayed (YES in ACT 14), the processor 31 reads the use history information of the MFP from the first storage region 35a of the DB 35 (ACT 15). When the processor 31 reads the use history information of the MFP, the processor 31 generates a menu screen based on the read use history information (ACT 16).

For example, when the customized screen illustrated in FIG. 2A is displayed, the processor 31 generates the menu screen 70 in which the first display region R1 is displayed in accordance with the history information of the MFP. When the menu screen 70 illustrated in FIG. 2A is generated, the processor 31 selects a predetermined number, in this case four, processing modes of high execution frequency from the use history information of the MFP. The processor 31 selects the setting information of the highest execution frequency for each of the selected processing modes. The processor 31 generates icons for selecting a process in accordance with the selected setting information for each of the selected processing modes. The processor 31 generates the menu screen 70 in which a predetermined number of generated icons are displayed.

When the customized screen is displayed (YES in ACT 13), the processor 31 determines whether the menu screen based on system history information is to be displayed (ACT 17). When the processor 31 determines that the system history information is to be displayed (YES in ACT 17), the processor 31 reads the system history information from the second storage region 35b of the DB (ACT 18). When the processor 31 reads the system history information, the processor 31 generates the menu screen based on the read system history information (ACT 19). For example, when the customized screen illustrated in FIG. 2A is displayed, the processor 31 generates the menu screens 80 and 90 in accordance with the system history information.

When all of the menu screens displayed on the customized screen are generated, the processor 31 combines the menu screens to generate the customized screen (ACT 20). When the processor 31 generates the customized screen, the processor 31 displays the generated customized screen on the display unit 45 of the operation panel 14 (ACT 21).

After the processor 31 displays the customized screen, the processor 31 detects an input to each menu screen in accordance with a detection signal of the touch panel 46. For example, when the processor 31 detects an input to a key for instructing to update the screen (YES in ACT 22), the processor 31 executes a process of updating the customized screen (ACT 23). For example, when the condition displayed in the selection field 95 is changed to "night" on the customized screen illustrated in FIG. 2A, the processor 31 updates the screen to the customized screen illustrated in FIG. 2B. The processor 31 generates the menu screen under the condition of "night" and updates the menu screen 90 in FIG. 2A to the menu screen 90' in FIG. 2B.

When an operation instruction is input on the operation panel 14, the processor 31 executes a process in accordance with the input operation instruction (ACT 25). For example, when any one of the icons is selected on the customized screen and operation start is instructed, the processor 31 executes the operation of the processing content in accordance with the selected icon.

In this way, the MFP generates the menu screens based on the history information preserved by the DB and displays the customized screen including the generated menu screens. Accordingly, the MFP according to the embodiment can supply the customized screen in accordance with the use history even when an individual user does not make a special instruction (an instruction to generate the customized screen). The MFP can supply not only the use history of the individual MFP but also the customized screen in accordance with the use history of a plurality of MFPs or the whole system. The MFP can supply not only the use history of the individual user but also the customized screen in accordance with the use history of the plurality of users.

Next, the use history information stored by the MFP 1 according to the embodiment will be described.

Figure 4:
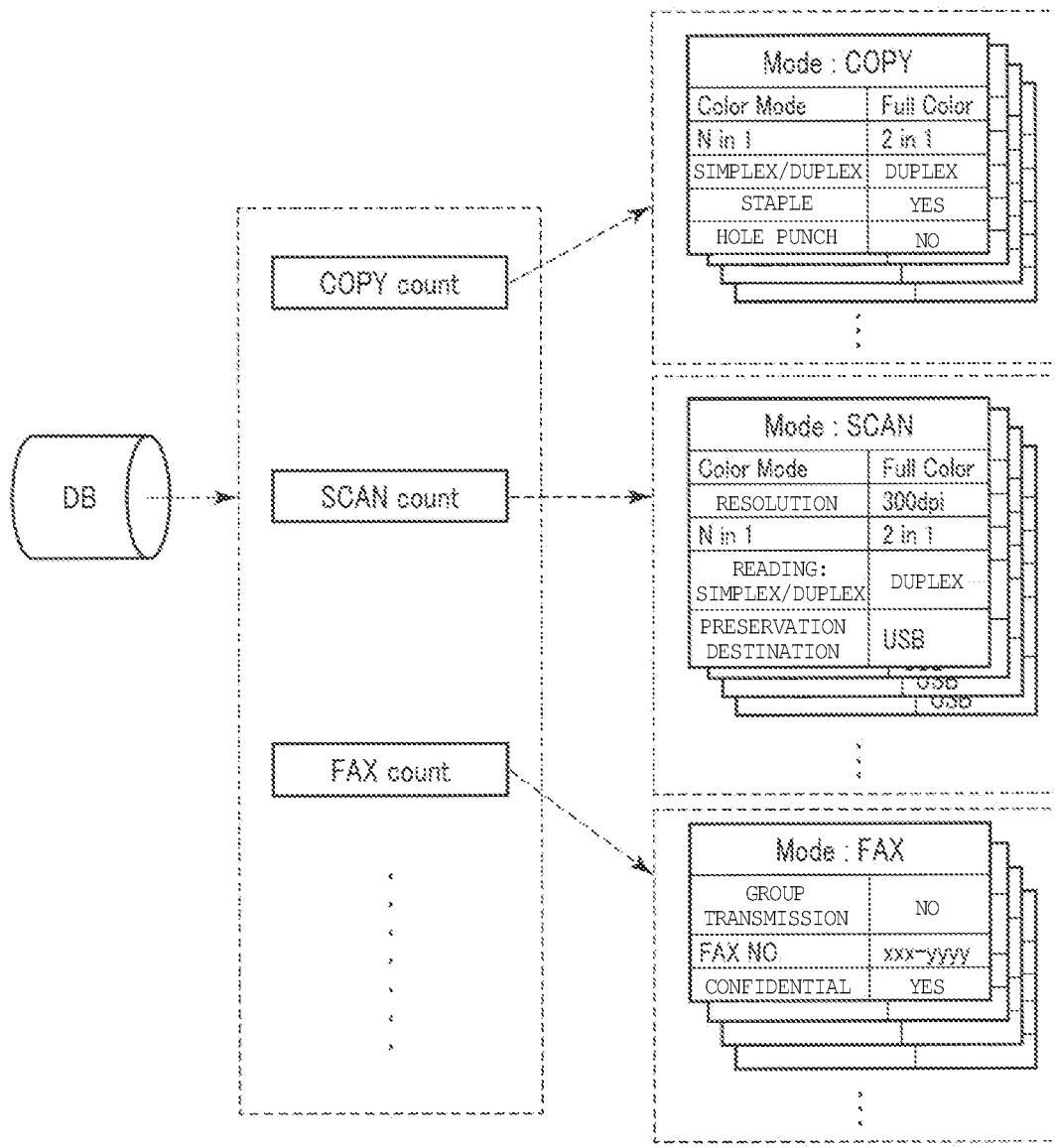
FIG. 4 is a diagram illustrating an example of the configuration of use history information stored in a database in the MFP serving as the image processing apparatus according to the embodiment.

FIG. 4 is a diagram conceptually illustrating an example of the configuration of information preserved by the DB 35 of the MFP 1 according to the embodiment.

The processor 31 of the MFP 1 generates the use history information indicating the executed processing content when a process (job) is executed. The processor 31 of the MFP 1 classifies the generated use history information by a plurality of granularities and preserves an aggregate (count) value of each classification in the DB 35. In the example illustrated in FIG. 4, the DB 35 stores values obtained by aggregating (counting) the use history information by two-step granularities, the processing mode (first-step classification) and detailed setting information (second-step classification). The processing modes are copy, scan, FAX, print, electronic file modes and the like. The DB 35 stores values obtained by counting the use history information for each processing mode. Further, the DB 35 stores values obtained by counting the use history information classified by each processing mode for each piece of setting information. According to the classification result illustrated in FIG. 4, it is possible to simply confirm the execution frequency of each processing mode and the frequencies of various kinds of setting in each processing mode.

The aggregate values may be obtained by counting the use history information classified by various conditions. For example, the first-step classification is not limited to the processing mode, but the use history information may be classified by each user executing a process or by a time period at which a process is executed. In the embodiment, the use history information of the process executed by each MFP is assumed to be aggregated by each MFP (own apparatus). However, the use history information of the process executed by each MFP may be executed by the server.

The data configuration illustrated in FIG. 4 is also applied to the DB 65 of the server 2. The server 2 stores the aggregate (count) values obtained by aggregating the use history information collected from each MFP in the system under various conditions in the DB 65.

Next, a registration process of registering the use history information of the process executed by the MFP 1 in the DB 35 will be described.

Figure 5:
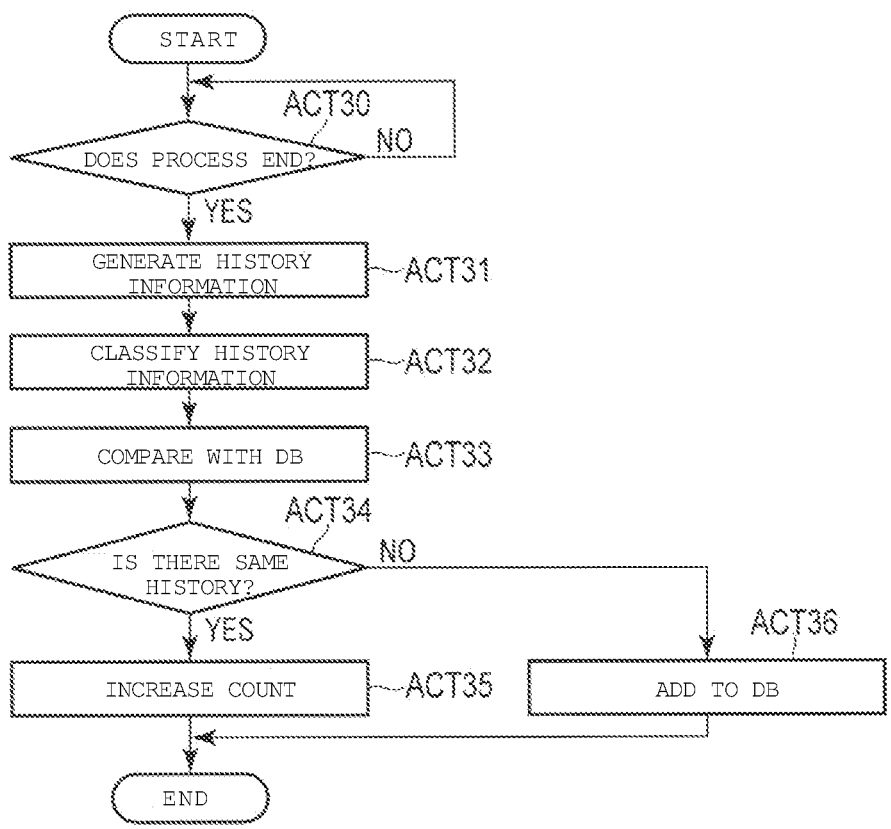
FIG. 5 is a flowchart illustrating a process of registering the use history information in the MFP serving as the image processing apparatus according to the embodiment.

FIG. 5 is a flowchart illustrating the registration process for the use history information in the MFP 1.

When the processor 31 of the MFP 1 executes the process (job) (YES in ACT 30), the processor 31 generates the use history information indicating the executed processing content (ACT 31). The use history information includes information such as execution times, executing users, processing modes, and set information. When the processor 31 generates the use history information, the processor 31 stores the generated use history information in the first storage region 35a of the DB 35. The processor 31 classifies the generated use history information (ACT 32). The processor 31 classifies the use history information in aggregated units. For example, the processor may classify the use history information by classification of a plurality of steps. Here, as illustrated in FIG. 4, the processor 31 is assumed to classify the use history information by each processing mode as the first-step classification and classify the use history information by each piece of setting information as the second-step classification.

When the processor 31 classifies the use history information, the processor 31 compares the classified use history information with the use history information registered in the DB 35 (ACT 33). In the comparison, the processor 31 determines whether there is use history information identical in the classification to count the use history information of the same classification. For example, when the processor 31 classifies the use history information by the processing mode and the setting information, the processor 31 determines whether the identical processing mode and setting information are registered.

When the processor 31 determines that the identical use history information is registered in the DB 35 (YES in ACT 34), the processor 31 adds (increases) the count value for the setting information of the processing mode by 1 (ACT 35). When the processor 31 determines that there is no registered use history information (NO in ACT 34), the processor 31 additionally registers the count value "1" for the processing mode and the setting information of the use history information to the DB 35.

When the processor 31 classifies the use history information under the conditions of a plurality of steps, the processor 31 aggregates the use history information for each classification of each step. For example, when the processor 31 executes the counting by the processing mode and the setting information, the processor 31 aggregates the count value of each processing mode and the count value of each piece of setting information and registers the aggregate results in the DB 35.

As described above, the MFP can simply accumulate the use history information and can also register the information aggregated by the classification under a specific condition in the database. When the use history information is aggregated by a plurality of kinds of classification, the MFP executes the above-described registration process for each of various kinds of classification. Accordingly, the MFP can register the information aggregated according to each of the plurality of kinds of classification in the database.

Next, information transmission between each MFP 1 and the server 2 will be described.

Figure 6:
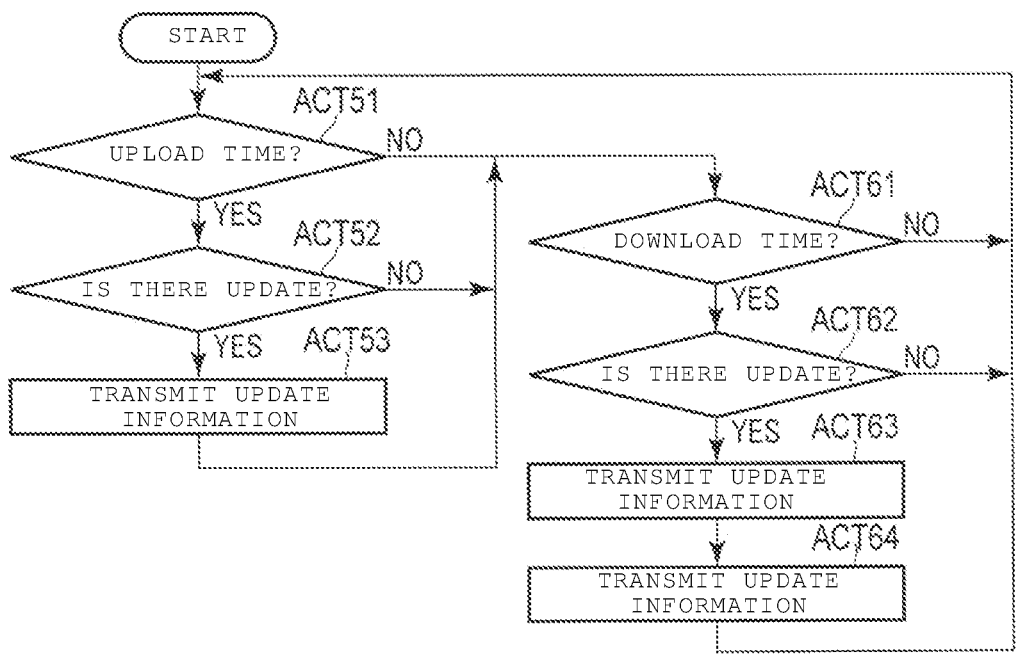
FIG. 6 is a flowchart illustrating a process of transmitting and receiving the use history information in the MFP serving as the image processing apparatus according to the embodiment.

FIG. 6 is a flowchart illustrating transmission and reception (upload and download) of the use history information in the MFP 1.

The processor 31 of the MFP 1 monitors whether an upload time of the use history information stored in the first storage region 35a of the DB 35 comes (ACT 51). The upload time may be set at time intervals or may be set to a date and time or a time. A set value of the upload time is stored in, for example, the data memory 34. When the processor 31 determines that the upload time has arrived (YES in ACT 51), the processor 31 determines whether information (update information) in the first storage region 35a has been updated (ACT 52). For example, the processor 31 determines whether there is new information in the first storage region 35a added since the previous upload time. When the processor 31 determines that there is no updated information (NO in ACT 52), the processor 31 determines that no upload is needed. When the processor 31 determines that there is updated information (YES in ACT 52), the processor 31 uploads the updated information among the information stored in the first storage region 35a to the server 2 (ACT 53).

Through the processes of ACT 51 to ACT 53 described above, each MFP 1 can upload the use history information accumulated in the first storage region 35a of the DB 35 to the server 2.

The processor 31 of the MFP 1 monitors whether a download time of the use history information of the entire system stored in the second storage region 35b of the DB 35 has arrived (ACT 61). A set value of the download time is stored in, for example, the data memory 34. The download time may be set at time intervals or may be set to a time. The download time may be set to be the same value as the upload time.

When the processor 31 determines that the download time has arrived (YES in ACT 61), the processor 31 determines whether there is updated information (update information) on the server 2 (ACT 62). For example, the processor 31 gives a request to download the update information to the server 2 and determines whether the server 2 responds with updated information. When the processor 31 determines that there is no updated information in the server 2 (NO in ACT 62), the processor 31 does not download information and waits for a future download time.

When the processor 31 determines that there is updated information on the server 2 (YES in ACT 62), the processor 31 downloads the updated information from the server 2 (ACT 63). The processor 31 updates the use history information of the entire system stored in the second storage region 35*b* of the DB 35 using the updated information downloaded from the server 2 (ACT 64).

Through the processes of ACT 61 to ACT 64 described above, each MFP 1 can accumulate the use history information of the entire system in the second storage region 35*b* of the DB 35.

Next, an operation of the server 2 will be described.

Figure 7:
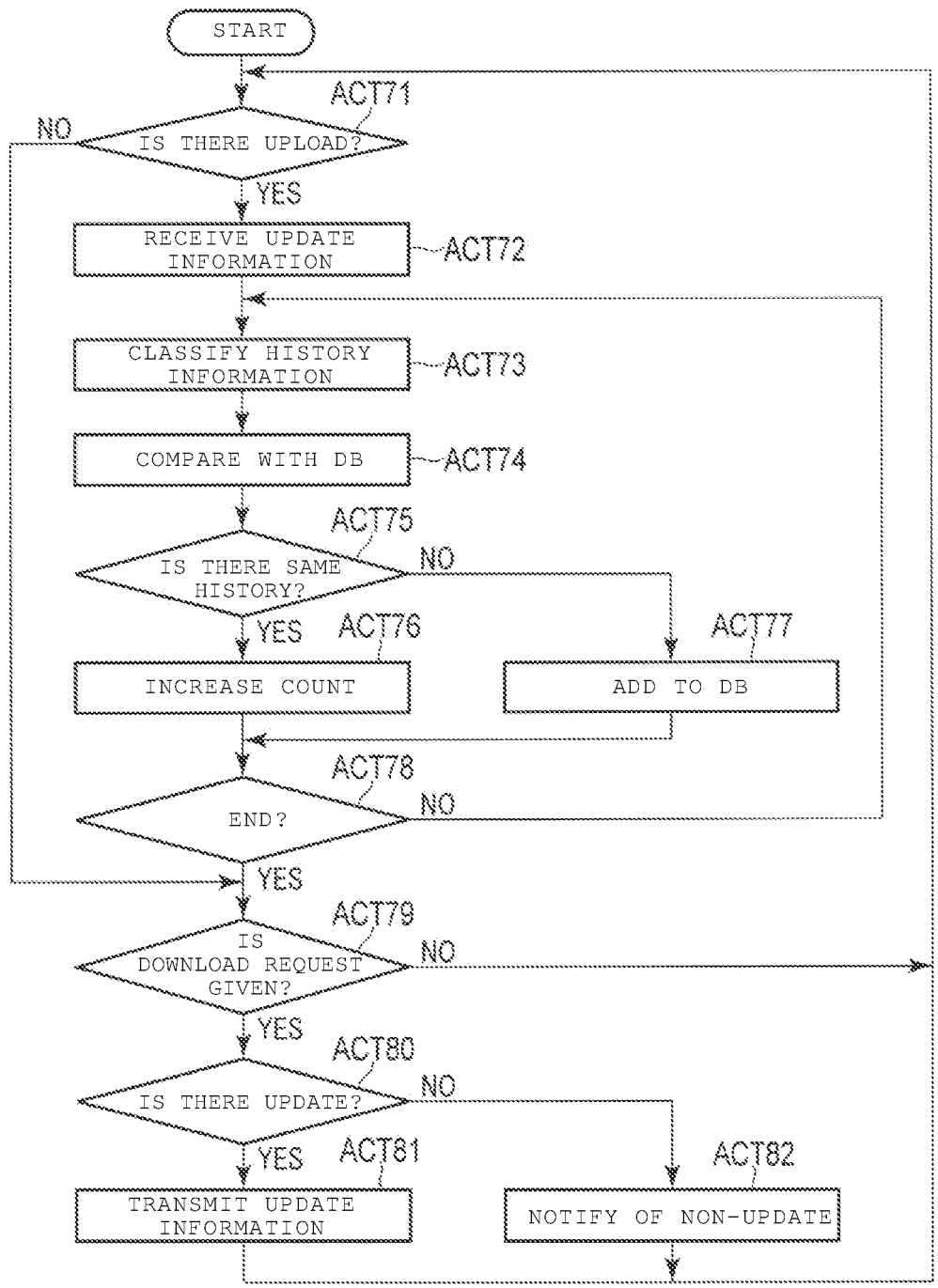
FIG. 7 is a flowchart illustrating an information management process by a server serving as an information management apparatus according to the embodiment.

FIG. 7 is a flowchart illustrating an information management process on the use history information of the entire system by the server 2.

The processor 61 of the server 2 receives an upload of updated information from each MFP 1 in the system (ACT 71). When the updated information is uploaded from a certain MFP 1, the processor 61 receives the updated information from the MFP 1 via the communication unit 66 (ACT 72). The processor 61 stores the received information in the DB 65. The processor 61 extracts one piece of use history information from the received information and classifies the use history information (ACT 73). The processor 61 classifies the use history information by predetermined categories. For example, the processor 61 classifies the use history information by processing mode as a first-step classification and classifies the use history information by setting information as a second-step classification, as in FIG. 4.

When the processor 61 classifies the use history information, the processor 61 compares the classified use history information with the use history information registered in the DB 65 (ACT 74). In the comparison, the processor 61 determines whether there is use history information identical in classification. For example, when the processor 61 classifies the use history information by processing mode and setting, the processor 61 determines whether there is use history for the identical processing mode and setting. When the processor 61 determines that the identical use history information is registered in the DB 65 (YES in ACT 75), the processor 61 increments (increases) the count value for the processing mode by 1 (ACT 76). When the processor 61 determines that there is no registered use history information (NO in ACT 75), the processor 61 stores the count value "1" for the processing mode and the setting information of the use history information to the DB 65.

The processor 61 executes the processes of ACT 73 to ACT 77 on all of the pieces of use history information included in the updated information. When aggregation of all of the pieces of use history information included in the updated information ends (YES in ACT 78), the processor 61 receives a download request or an upload from each MFP 1.

When the processor 61 receives a download request from a certain MFP 1 (YES in ACT 79), the processor 61 determines whether there is updated information (the update information) in the DB (ACT 80). When the processor 61 determines that there is updated information (YES in ACT 80), the processor 61 transmits the updated information to the MFP 1 which requested the download (ACT 81). Conversely, when the processor 61 determines that there is no updated information (NO in ACT 80), the processor 61 notifies the MFP 1 that requested the download that there is no updated information (ACT 82).

According to the embodiment, as described above, the server can register the information aggregated by the specific classification of the use history information collected from each MFP in the database.

The server may acquire aggregate results by the specific classification from each MFP and register an aggregate value obtained by adding the aggregate results acquired from the MFPs in the database. When the server aggregates the aggregate results by a plurality of kinds of classification, the aggregate value of each classification is assumed to be preserved in the database. As described above, in the server, information aggregated by various kinds of classification of the use history information of the entire system can be preserved in the database.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising:
an interface device configured to receive an operation instruction to execute a plurality of processing jobs based on the operation instruction;
an image processing device configured to execute an image forming process based on the processing jobs received from the interface device;
a storage unit configured to store a plurality of sets of use history information indicating prior processing jobs;
a display unit configured to display an operation screen, the operation screen including:
a first region including a first symbol corresponding to one of the plurality of processing jobs,
a first selector to select a first attribute corresponding to a plurality of sets of use history information,
a second region including a second symbol corresponding to one of the plurality of processing jobs, and
a second selector to select a second attribute corresponding to the plurality of sets of use history information; and
a processor configured to:
cause the first region of the operation screen to be customized based on one of the plurality of sets of use history information having the first attribute selected with the first selector and the second region to be customized based on another one of the plurality of sets of use history information having the second attribute selected with the second selector, and cause the display unit to display the operation screen with the customized first region and second region.

2. The image processing apparatus according to claim 1, wherein the plurality of sets of use history information includes a set of local use history information and a set of entire system use history information indicating prior processing jobs performed by the image processing apparatus and other image processing devices.

3. The image processing apparatus according to claim 1, wherein the processor is further configured to include an icon for selecting a process corresponding to setting information and a processing mode having a high execution frequency in the local use history information.

4. The image processing apparatus according to claim 3, wherein the local use history information includes prior processing jobs performed by the image processing apparatus.

5. The image processing apparatus according to claim 1, further comprising:
   a network interface configured to receive the entire system use history information.

6. The image processing apparatus according to claim 1, wherein the first attribute is a user-type attribute and the second attribute is a location attribute of the image processing apparatus.

7. The image processing apparatus according to claim 1, wherein the first attribute is a previous use date range.

8. The image processing apparatus according to claim 1, wherein the first attribute is a user attribute.

9. The image processing apparatus according to claim 8, wherein the user attribute is acquired by a user authentication process.

10. An image processing apparatus, comprising:
   a display unit configured to display an operation screen with a first region and a second region, each of the first and second regions displaying user-selectable processing operation icons which when selected by a user causes a processing job corresponding to the selected processing operation icon to be generated, the first region including a first attribute selector and the second region including a second attribute selector;
   a user interface device configured to receive an input operation from the user for selecting one of the processing operation icons and to transmit the processing job corresponding to the one of the processing operation icons selected by the input operation;
   an image processing device configured to execute an image forming process based on the generated processing job;
   a storage unit configured to store use history indicating prior processing jobs, each of the prior processing jobs being associated with one or more attributes in the use history; and
   a processor configured to:
      customize the processing operation icons displayed in the first region based upon the prior processing jobs in the stored use history that have a first attribute set by the first attribute selector, and
      customize the processing operation icons displayed in the second region based upon the prior processing jobs in the stored use history that have a second attribute set by the second attribute selector.

11. The image processing apparatus according to claim 10, wherein the use history is a local use history only including the prior processing jobs performed by the image processing apparatus.

12. The image processing apparatus according to claim 10, wherein the use history includes a system use history including the prior processing jobs performed by a plurality of different image processing apparatuses connected by a network.

13. The image processing apparatus according to claim 12, wherein the use history includes a local use history only including the prior processing jobs performed by the image processing apparatus itself.

14. The image processing apparatus according to claim 10, wherein the user interface is a touch panel integrated with the display unit.

15. The image processing apparatus according to claim 10, wherein the first attribute selector is a drop-down menu.

16. The image processing apparatus according to claim 10, wherein the first attribute is a user-type attribute and the second attribute is a location attribute of the image processing apparatus.

17. The image processing apparatus according to claim 10, wherein the first attribute is a previous use date range.

18. The image processing apparatus according to claim 10, wherein the first attribute is a user attribute.

19. The image processing apparatus according to claim 10, further comprising:
   a scanning device configured to execute a document scanning process based on the generated processing job; and
   a fax unit configured to execute a facsimile communication process based on the generated processing job.

20. A multi-functional peripheral device, comprising:
   a touch panel display screen configured to display an operation screen with a first region and a second region, each of the first and second regions displaying user-selectable processing operation icons which when selected by a user causes a processing job corresponding to the selected processing operation icon to be generated, the first region including a first attribute selector and the second region including a second attribute selector;
   an image processing device configured to execute an image forming process based on the generated processing job when the processing job includes a print job;
   a scanning device configured to execute a document scanning process based on the generated processing job includes a scanning job;
   a storage unit configured to store use history indicating prior processing jobs, each of the prior processing jobs being associated with one or more attributes in the use history; and
   a processor configured to:
      customize the processing operation icons displayed in the first region based upon the prior processing jobs in the stored use history that have a first attribute set by the first attribute selector, and
      customize the processing operation icons displayed in the second region based upon the prior processing jobs in the stored use history having a second attribute set by the second selector.

\* \* \* \* \*